Nov. 20, 1934.    L. F. CARTER    1,981,687
GYROSCOPIC BASE LINE
Filed April 5, 1923    3 Sheets-Sheet 2
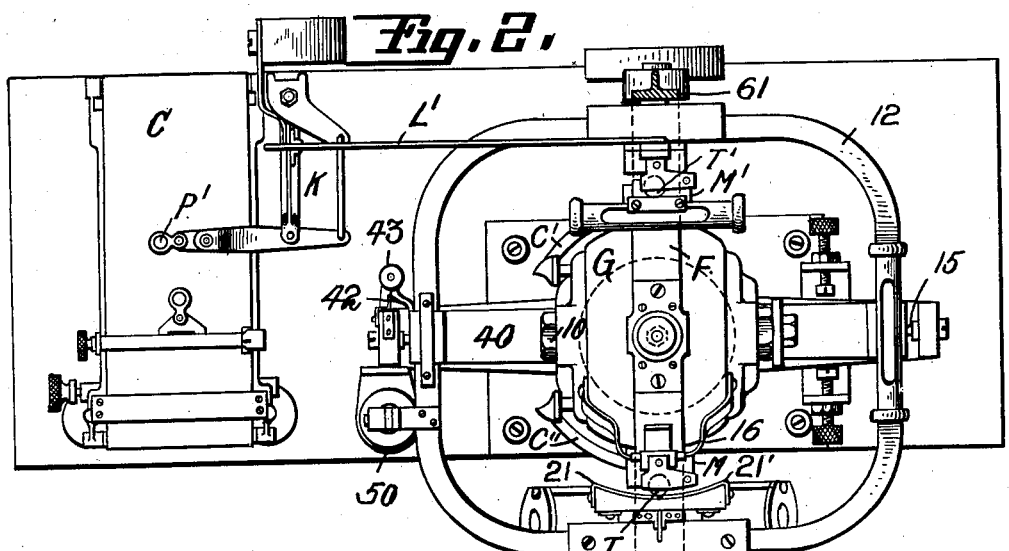
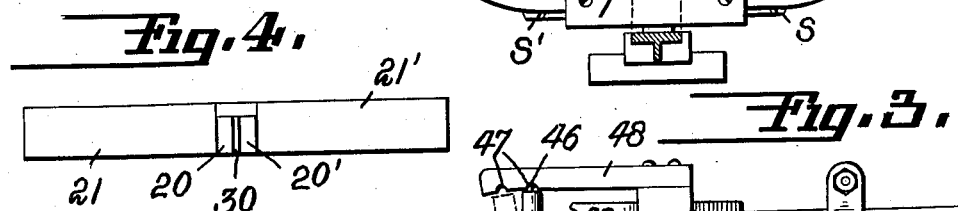
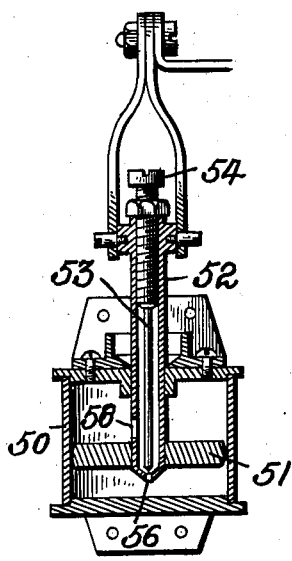
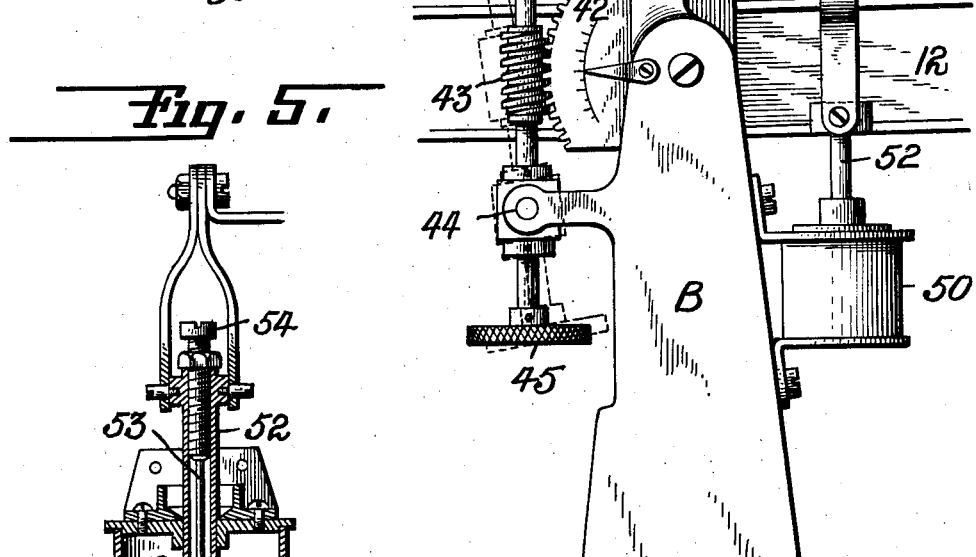
INVENTOR
Leslie F. Carter.
BY Herbert H. Thompson
his ATTORNEY.

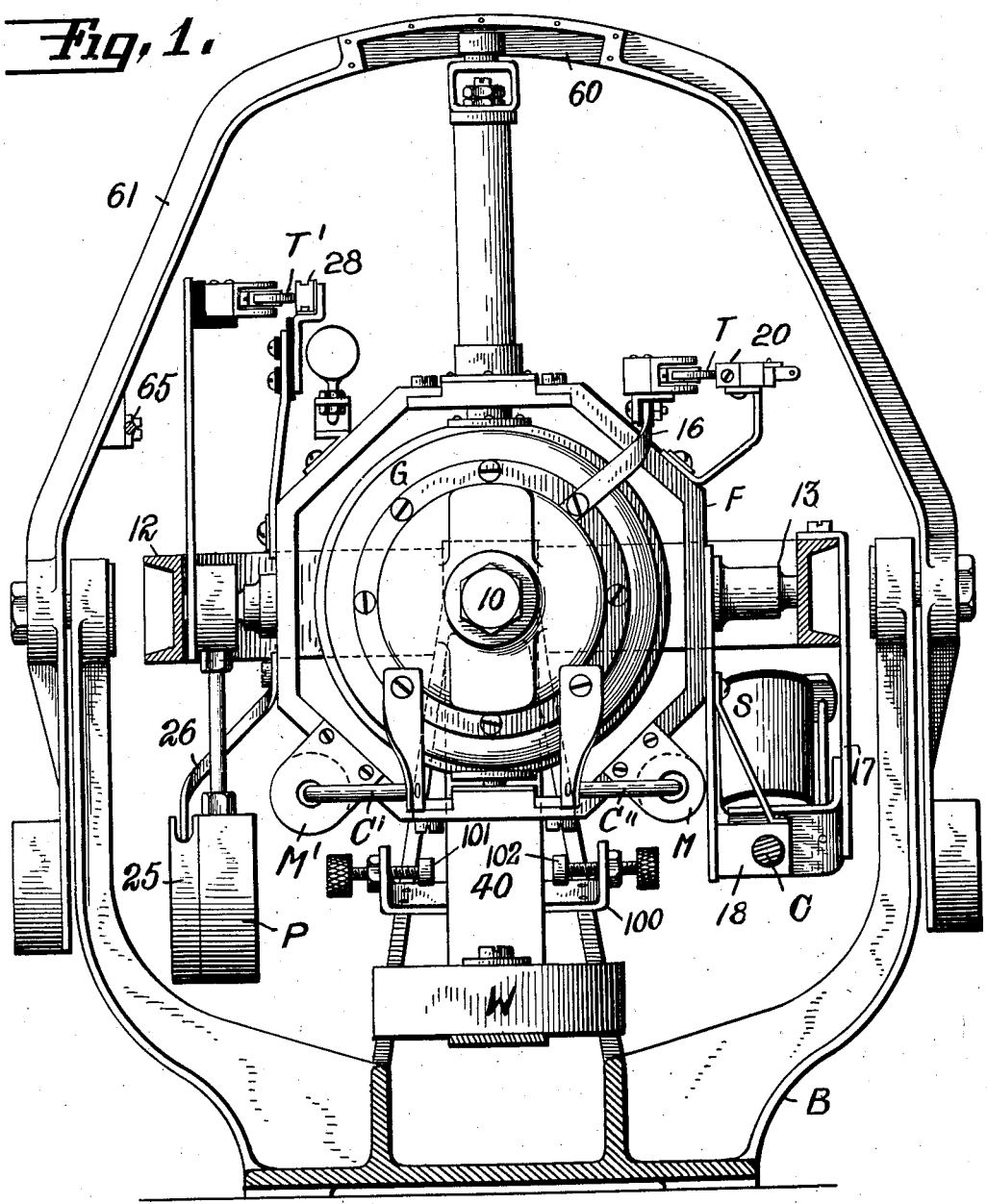

Nov. 20, 1934.  L. F. CARTER  1,981,687
GYROSCOPIC BASE LINE
Filed April 5, 1928  3 Sheets-Sheet 3
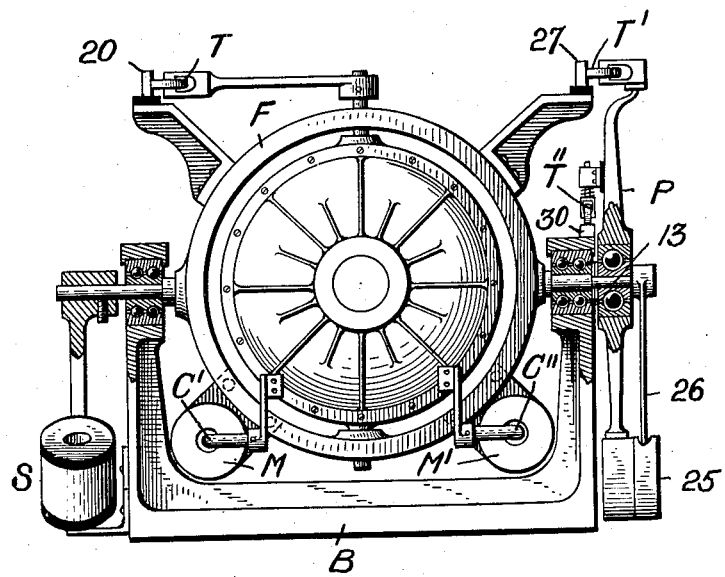
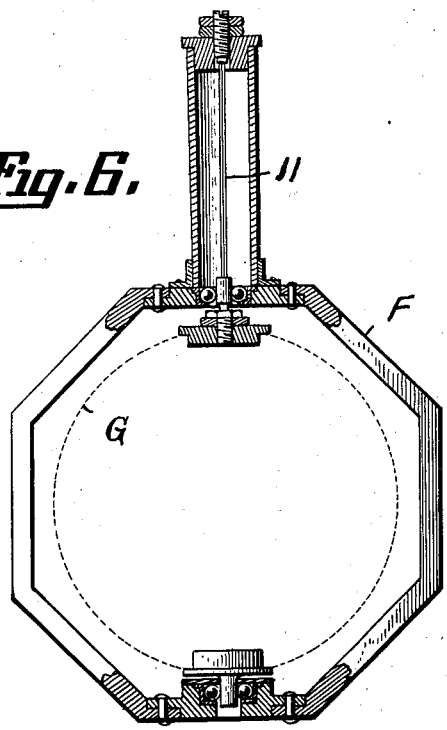
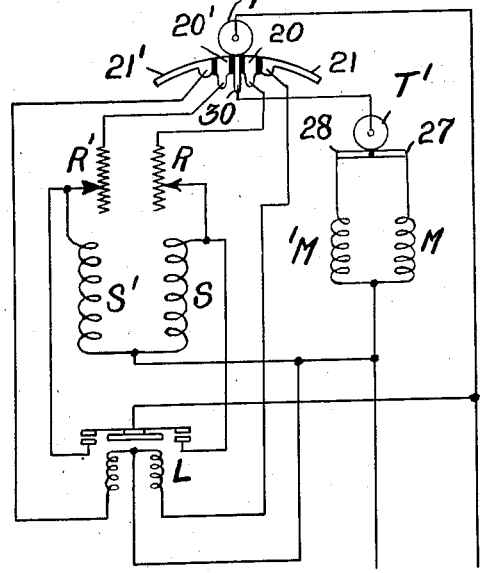
INVENTOR
LESLIE F. CARTER
BY
Herbert H. Thompson
his ATTORNEY.

Patented Nov. 20, 1934

1,981,687

UNITED STATES PATENT OFFICE 1,981,687

GYROSCOPIC BASE LINE

Leslie F. Carter, Leonia, N. J., assignor, by mesne assignments, to Sperry Products, Inc., Brooklyn, N. Y., a corporation of New York Application April 5, 1928, Serial No. 267,761

13 Claims. (Cl. 33—204)

This invention relates to means for maintaining a true base-line or reference plane from which variations may be indicated, and is an improvement over my copending joint application with Mortimer F. Bates, Serial No. 100,737, filed April 8, 1926, now Patent No. 1,801,329, granted April 21, 1931. The invention relates more specifically to gyroscopically maintained verticals and has for its general object the provision of a gyro vertical which shall remain unaffected by acceleration forces due to variations in speed in a straight line or to movements around a curve. Such a vertical is particularly serviceable in track recorder instruments, since the latter are mounted on railroad cars, subject to all manner of variations in speed and to changes in the direction of travel. The invention is, however, capable of broad application whenever a fixed reference plane is to be maintained, especially upon moving objects or vehicles.

Another object of this invention is to maintain the gyro frame always vertical and to prevent said frame from becoming displaced either through an incorrect initial setting or because of the rotation of the earth or for some other reason. Under these circumstances there is nothing in the said copending joint application to bring the frame back when the gyro element is non-pendulous. I, therefore, provide means between the gyro frame and a base-line for indicating deviations of said frame from the vertical, as well as suitable means for restoring said frame to the vertical without introducing an error in the position of the gyro. For this purpose I may provide a pendulum co-acting with a fixed support, said pendulum and support carrying contact elements for energizing suitable torque-producing devices.

Since when traveling around a curve the vehicle, upon which the gyro vertical is mounted, banks, and at the same time the pendulum described in the preceding paragraph is thrown out by centrifugal force, it will be seen that an error is thus introduced in the means for indicating the vertical to the extent that there will be apparently no deviation of the gyro frame from the vertical, when in fact the frame and the fixed support have deviated from the vertical to the same extent. Such acceleration forces are introduced only during turn of the vehicle on which the gyro vertical is mounted. Hence, I provide means for rendering ineffective the means for maintaining the gyro frame vertical whenever there is turning of the craft and for rendering said means again effective when said turning has ceased.

It is a further object of my invention to provide means as described in the preceding paragraph so that it is impossible for the means which maintains the gyro frame vertical to be rendered effective while the craft is still turning. For this purpose, I may employ delayed-action means which will delay rendering said vertical-maintaining means effective until turning of the craft has definitely ceased.

If a gyro mounted as hereinbefore described is inclined so that when the craft turns in azimuth, such turning is about a different axis than the axis of suspension of the gyro, then it has been found that a precessional movement is set up in the gyro which results in an error in vertical position. It is another object of my invention, therefore, to provide means for assuring that the axis of suspension of the gyro is at all times coincident with or parallel to the axis about which the craft turns in azimuth.

Still other objects and advantages of this invention will be set forth in the following detailed description thereof.

In the accompanying drawings—

Fig. 1 is a side elevation, partly sectioned vertically, of a gyro vertical embodying my invention.

Fig. 2 is a plan view of the device shown in Fig. 1.

Fig. 3 is an enlarged detail of one means for making the axis of the gyro suspension parallel with the axis of turn in azimuth.

Fig. 4 is an enlarged detail of a novel contact segment employed in the invention.

Fig. 5 is a vertical section through a dashpot utilized in the apparatus shown in Fig. 3.

Fig. 6 is an enlarged view, partly sectioned vertically, of the gyro suspension.

Fig. 7 is a wiring diagram.

Fig. 8 is a side elevation, partly sectioned vertically, of a gyro vertical having a modified form of pendulum control.

Referring to Fig. 1 of the drawings, there is shown a gyro unit G comprising a gyroscope enclosed in a casing and adapted to spin about a horizontal axis 10 within said casing, said casing being suspended within a frame F by means of a bundle of torsion wires 11 in a manner well known in the gyroscopic compass art. The gyro unit is for brevity hereinafter referred to as gyro G. The particular function of said torsion suspension in this invention will be pointed out fully hereinafter. The said frame F is pivotally supported within a frame 12 upon horizontal pivots forming an axis of oscillation 13. Said frame 12 is in turn pivotally mounted about a horizontal axis of oscillation 15, at right angles to axis 13, within the fixed base or support B. The reason why said frame F is mounted within a frame 12 rather than directly in the base B will be pointed out fully hereinafter. The mounting, as above described, is for the purpose of maintaining a vertical plane and would ordinarily indicate any deviations of the base B, or the craft upon which base B is mounted, from the horizontal, that is, it would indicate any movements about axis 13, as for instance, differences in elevation of the rails, causing such inclination of the car and base B, for axis 13 is assumed to be the fore and aft axis.

A gyroscope, such as the one forming part of the gyro G, having three degrees of freedom and being non-pendulous, would ordinarily maintain its position in space regardless of the movements of support B. Thus, if the gyro were originally in a vertical plane and the base B were turned in azimuth, the frame F would also be carried around in azimuth but the gyro G would maintain its position in space and thus be displaced relative to the frame F. I provide means for causing the gyro G to maintain its centralized position with respect to said frame F at all times. For this purpose I connect to the gyro G by any suitable supporting means, such as bracket 16, a trolley T operating in cooperative relation to contacts which are adapted to control a pair of torque applying means, such as solenoids comprising a pair of magnets S—S' supported on frame 12 by means such as a bracket 17 and a common core C fixed to frame F by means such as a bracket 18. Thus, when the gyro deviates with respect to frame F in one direction, solenoid S is energized, and when said gyro deviates with respect to said frame in the other direction, solenoid S' is energized, said solenoids acting upon the same core C to apply a force about the horizontal axis 13 of frame F in one direction or the other to cause said gyro to precess about the vertical axis of suspension into centralized position. When the gyro reaches its centralized position, the circuit through the solenoids is broken. The contact system employed is shown more fully in Fig. 7 and comprises two sets of contacts on either side of the insulation. Said contacts are 20, 20' and 21, 21'. When trolley T engages contact 20 or contact 20', the amount of deviation of the gyro from the centralized position with respect to frame F is small and hence the circuit through solenoids S or S' includes a resistance R or R' to cut down the capacity of the solenoid and so apply a relatively small torque to return the gyro slowly. When, however, the gyro deviates from its centralized position to a degree sufficient to cause trolley T to engage contacts 21 or 21', then the resistances R, R' are short-circuited by means of a relay L which is then energized and the full force of the solenoids S or S' is employed to restore the gyro quickly toward centralized position. As the gyro approaches centralized position and trolley T engages contact 20 or 20', the resistances R—R' again become effective to cut down the capacity of the solenoids. The action of restoring the gyro to centralized position is thus a rapid one initially to bring the gyro approximately to centralized position, and then slow movement to bring the gyro exactly to centralized position. This structure is essential not only because it is desirable to prevent the gyro from becoming so far displaced from its centralized position that it may possibly assume an inoperative position, that is 90° displacement, but is also of value to prevent the vertical-maintaining means from becoming effective before turning of the conveyance has ceased, as will be described more fully hereinafter.

It is possible for the frame F to become more or less displaced from the vertical either through incorrect initial setting or because of the rotation of the earth from under the gyro which tends to maintain its position in space, thus introducing a tilt in the gyro frame F. To compensate for such forces and eliminate the errors resulting therefrom, I provide means for indicating such deviation from the true vertical and further means controlled by said indicating means for introducing a correction. For this purpose I utilize some vertical maintaining means, such as a pendulum P, loosely journaled about axis 13 and having at its lower end a compartment 25 filled with a viscous fluid in which may operate a fin 26 carried by the frame F to prevent rapid vibration of said pendulum so that slight forces acting about axis 13 will not appreciably affect it. Any deviation of the frame F from the vertical, as indicated by pendulum P, will cause a trolley T', carried by pendulum P, to move off a strip of insulation separating live contact segments 27—28 which control the circuits through torque-applying means, such as solenoids M—M', which are carried by frame F and attract cores C' C" to impress a force around the vertical axis of the gyro. Such a force impressed in the proper direction by solenoid M or solenoid M', depending upon the direction of movement of trolley T' and whether it engages contact segment 27 or 28, will cause the gyro to precess about the horizontal axis 13 into the vertical position, in which position trolley T' again rests upon the insulating segment.

When a vehicle, such as a railroad car, upon which this device may be mounted, goes around a curve, the car banks and hence the fixed support or base B also becomes inclined. If the pendulum P maintained the vertical while travelling around the curve no error would be introduced, but the centrifugal force throws the pendulum outwardly perhaps to a degree corresponding to the angle of tilt of base B. In any case it is apparent that, upon turning, the pendulum P no longer indicates true vertical, and trolley T', cooperating with contacts 27 and 28, would tend to give a false position to the frame F. To obviate this incorrect condition, I provide means for cutting out the means for maintaining frame F vertical when there is acceleration due to turning of the craft in azimuth, that is, about the vertical axis. This means includes a contact 30 positioned centrally within the insulation strip separating contacts 20 and 20' (see Fig. 7). This contact and trolley T, it will be seen from said Fig. 7, are in the circuit of solenoids M—M', so that when trolley T moves off said contact 30, it is impossible for trolley T', in engagement with contact 27 or 28, to energize solenoids M—M'. That is to say, since trolley T is controlled by the turning of the craft in azimuth, any such turning sufficient to cause trolley T to leave contact 30 will render the vertical maintaining means, including the solenoids M—M', ineffective until such turning has ceased, that is to say, until trolley T again engages contact 30.

It has heretofore been described that it is desirable to provide a relatively powerful torque about the horizontal axis 13 in order to prevent too great displacement of the gyro within frame F, perhaps to an indefinite position. Therefore, the full strength of electro-magnets S—S' is employed to restore the gyro toward undisplaced position rapidly. This, however, may take place before the craft has ceased turning, in which case the trolley T would engage contact 30 before turning has ceased, and the vertical maintaining means would be rendered effective too soon. This undesirable result, however, is obviated by the structure hereinbefore described wherein trolley T engages contact 20 or 20' before reaching its centralized position, and such engagement causes resistances R—R' to be introduced in the circuit of solenoids S—S', thus reducing the speed with which the gyro returns to its centralized position. The contact system with which trolley T engages and the circuits which it controls thus constitute in effect a delayed action means for preventing rendering of the vertical maintaining means effective until the gyro has fully returned to centralized position, that is to say, until turning in azimuth has ceased.

In Fig. 8 I have illustrated another form of means for rendering the vertical maintaining means ineffective while the base B or the craft upon which it is mounted is turning in azimuth. In the Fig. 1 form of the device I have made use of the fact that upon turning there is relative displacement between the gyro G and the frame F, and that such displacement would cause trolley T to leave the narrow contact segment 30 and thus break the circuit through the solenoids M—M' to render the vertical maintaining means ineffective. In the Fig. 8 form of my invention I utilize the fact that turning is always accompanied by banking and hence there will be displacement of the pendulum P with respect to the fixed support or base B which becomes inclined. Therefore, I may provide pendulum P with a trolley T'' which when base B is not banked or inclined engages the live contact segment 30 which, for this purpose, may be separated from the contact element with which trolley T engages in the Fig. 1 form. The circuit through the solenoids M—M' is again controlled by contact segment 30 and trolley T'' so that as soon as there is turning and hence banking of the craft, trolley T'' will disengage contact 30 to render the vertical-maintaining magnets M—M' ineffective.

When the device is employed on a vehicle, such as a railway car, and said car is on a grade, that is, the fore and aft axis of mounting of the gyro frame F is inclined, and if in this condition the car turns in azimuth, that is to say, the car turns about a vertical axis while the axis of suspension of the gyro is inclined to the vertical, there is found that a precession is set up in the gyro which results in an error in indication. It is desirable, therefore, that the axis 13 of the gyro frame shall not become inclined when the base B is inclined and, therefore, I have provided the additional ring 12, which by oscillating about axis 15 permits the axis 13 to remain horizontal regardless of the inclination of the car and base B. The said ring 12 may be made pendulous by means such as a weight W suspended therefrom in a suitable bracket 40, so that said ring 12 will be maintained horizontal at all times.

In order to damp the rapid oscillations of ring 12 due to the vibrations of the car on which the apparatus is mounted, I may provide a dashpot 50 fixed to the fixed frame or base B in which operates a piston 51 carried at the end of a stem 52 pivotally connected to the ring 12. Said stem 52 may be hollow as shown and have extending therein a regulator 53, which may be operated from outside stem 52 by an adjusting nut 54 fixed to said regulator 53 so that the latter may be screwed inwardly or outwardly to vary the orifice 56 so that fluid will pass through said orifice 56 and through orifice 58 more or less rapidly to provide greater or lesser damping action.

In order to prevent excessive swinging of weight W in response to forces of acceleration I may provide on the base B a U-shaped bracket 100 provided with stops 101 and 102 on opposite sides of the member 40 which supports weight W. Said stops are screw threaded in the arms of the U to permit adjustment of position. This adjustment will provide for a normal clearance sufficient to take care of the swinging of weight W in response to the maximum grades that will be encountered on a given track but will prevent swinging in excess of these permissible limits.

I may accomplish the same result by hand operation as I obtain by the use of the weight W. In this form of the invention I provide between the ring 12 (which may or may not have weight W) and the fixed frame B, a gearing connection which may be operated by hand to set ring 12 in a position to counteract the effect of any known grade. Thus the operator being familiar with the degree of inclination at any given stretch of track can, on approaching said grade, incline ring 12 in an equal and opposite direction to said grade so that the axis of suspension of the gyro will remain vertical in spite of the inclination of the tracks. Referring to Fig. 3, it will be seen that I have provided on ring 12 a worm rack 42 with which is adapted to mesh a worm 43 carried on a shaft which is pivotally mounted in bracket B at 44, said shaft having a knob or handle 45 at its outer end whereby it may be operated. The pivotal connection at 44 enables the worm to be moved out of engagement with the rack 42 when desired. For the purpose of fixing the worm in its effective position (shown in full lines in Fig. 3) and in its ineffective position (shown in dotted lines in Fig. 3) I may provide a spring detent 46 in the end of the worm shaft adapted to engage any one or the other of two detent grooves 47 provided in a member 48 fixed to base member B at the outer end of said worm shaft.

Since it is only desired to record the movements of base B relative to the fixed vertical about axis 13, and since said gyro may also oscillate with ring 12 about axis 15, it is desirable to provide a track or runway 60 in a frame 61 pivotally mounted on base B on the same axis as axis 13. The upper end of the gyro suspension may operate in said track when movements occur around axis 15 so that if the recording linkage indicated generally by the numeral K, which carries the pen P' in engagement with the recording chart C, is connected to said frame 61, it will partake only of the movements about axis 13, whereas if it were connected to the gyro suspension or frame F, it would partake of movements about both axes 13 and 15. Hence the linkage K is connected by means such as link L' to the frame 61 at point 65 as shown in Fig. 1.

It will be noted that friction in the gyro support will tend to set up precession of the gyro and thus introduce an error, but this tendency is counteracted by the torsional suspension because the torsion produces a torque in the opposite direction and to substantially the same degree.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a device of the class described, a frame, a fixed support, a gyro unit supported by said frame for movement about a vertical pivotal axis and having a horizontal spinning axis, and means for universally supporting said frame in said fixed support about horizontal axes in the plane of said spinning axis whereby inclination of said gyro unit with respect to the vertical is prevented when said fixed support is inclined with respect to the horizontal.

2. In a device of the class described, a frame, a fixed support, a gyro unit supported by said frame for movement about a vertical pivotal axis and having a horizontal spinning axis, and means for universally supporting said frame in said fixed support about horizontal axes in the plane of said spinning axis, said means including a ring in which said frame is pivoted about a horizontal axis, said ring being pivoted in said fixed support about a horizontal axis at right angles to the supporting axis of the frame whereby inclination of said gyro unit with respect to the vertical is prevented when said fixed support is inclined about said second horizontal axis.

3. In a device of the class described, a frame, a fixed support, a gyro unit supported by said frame for movement about a vertical axis, means for universally supporting said frame in said fixed support about horizontal axes, said means including a ring in which said frame is pivoted about a horizontal axis, said ring being pivoted in said fixed support about a horizontal axis at right angles to the supporting axis of the frame, and hand-operated means between said ring and said fixed support whereby inclination may be imparted to said ring about said second horizontal axis equal and opposite to the inclination of the fixed support about said second horizontal axis.

4. In a device of the class described, a support, a frame pivotally mounted for movement about an axis in said support, a gyro unit pivotally mounted in said frame in a predetermined normal relation thereto for movement about an axis at an angle to said first axis, means for causing said gyro unit to follow the movements of said frame in azimuth, means whereby said first means is rendered effective when said gyro unit is displaced about its axis of support from its normal position with respect to said frame, means for maintaining said frame in predetermined position with respect to the vertical, and means whereby said last-named means is rendered effective when said frame is displaced from said predetermined position with respect to the vertical.

5. In a device of the class described, a support, a normally vertical frame pivotally mounted for movement about a horizontal axis in said support, a gyro unit pivotally mounted in said frame for movement about a vertical axis and having its spinning axis at an angle to the vertical, means for causing said gyro unit to follow the movements of said frame in azimuth, means whereby said first means is rendered effective when said gyro unit and said frame are displaced from a predetermined position with respect to each other, means for applying a torque to said gyro unit about said vertical axis to cause precession of said frame about said horizontal axis, and means whereby said torque-applying means is rendered effective when said frame is displaced from the vertical.

6. In a device of the class described, a support, a normally vertical frame pivotally mounted for movement about a horizontal axis in said support, a gyro unit pivotally mounted in said frame for movement about a vertical axis and having its spinning axis at an angle to the vertical, means for causing said gyro unit to follow the movements of said frame in azimuth, means whereby said first means is rendered effective when said gyro unit and said frame are displaced from a predetermined position with respect to each other, means for maintaining said frame vertical, and means whereby said vertical-maintaining means is rendered ineffective when said frame turns in azimuth with respect to said gyro unit.

7. In a device of the class described, a support, a normally vertical frame pivotally mounted for movement about a horizontal axis in said support, a gyro unit pivotally mounted in said frame for movement about a vertical axis and having its spinning axis at an angle to the vertical, means for causing said gyro unit to follow the movements of said frame in azimuth, means whereby said first means is rendered effective when said gyro unit and said frame are displaced from a predetermined position with respect to each other, means including a pendulum responsive to deviations of said frame from vertical, means for restoring said frame to vertical, means including electric contacts carried by said pendulum and said frame whereby said deviation-responsive means renders said frame-restoring means effective when said frame is displaced from vertical, and means including electric contacts carried by said pendulum and said support whereby said last-named means is rendered ineffective when said frame turns in azimuth.

8. In a device of the class described, a support, a normally vertical frame pivotally mounted for movement about a horizontal axis in said support, a gyro unit pivotally mounted in said frame for movement about a vertical axis and having its spinning axis at an angle to the vertical, means for causing said gyro unit to follow the movements of said frame in azimuth, means whereby said first means is rendered effective when said gyro unit and said frame are displaced from a predetermined position with respect to each other, means for maintaining said frame vertical, means controlled by the relative displacement of said gyro unit and said frame whereby said vertical-maintaining means is rendered ineffective when said frame turns in azimuth, and means whereby the action of said last named means is prolonged until said turning has ceased.

9. In a device of the class described, a support, a normally vertical frame pivotally mounted for movement about a horizontal axis in said support, a gyro unit pivotally mounted in said frame for movement about a vertical axis and having its spinning axis at an angle to the vertical, means for causing said gyro unit to follow the movements of said frame in azimuth, means whereby said first means is rendered effective when said gyro unit and said frame are displaced from a predetermined position with respect to each other, said first means including means for causing said gyro unit to follow said frame relatively rapidly and means rendered effective by the approach of said gyro unit to predetermined position with respect to said frame for causing said gyro unit to follow said frame relatively slowly, means for applying a torque to said gyro unit about said vertical axis to cause precession of said frame about said horizontal axis, and means whereby said torque-applying means is rendered effective when said frame is displaced from the vertical.

10. In a device of the class described, a support, a normally vertical frame pivotally mounted for movement about a horizontal axis in said support, a gyro unit pivotally mounted in said frame for movement about a vertical axis and having its spinning axis at an angle to the vertical, means for causing said gyro unit to follow the movements of said frame in azimuth, means whereby said first means is rendered effective when said gyro unit and said frame are displaced from a predetermined position with respect to each other, said first means including means for causing said gyro unit to follow said frame relatively rapidly and means rendered effective by the approach of said gyro unit to predetermined position with respect to said frame for causing said gyro unit to follow said frame relatively slowly.

11. In a device of the class described, a support, a frame pivotally mounted for movement about an axis in said support, a gyro unit pivotally mounted in said frame in a predetermined normal relation thereto for movement about an axis at an angle to said first axis, means for causing said gyro unit to follow the movements of said frame in azimuth, means whereby said first means is rendered effective when said gyro unit is displaced about its axis of support, from its normal position with respect to said frame, a pendulum, means for maintaining said frame in predetermined position with respect to said pendulum, and means whereby said last named means is rendered effective when said frame is displaced with respect to said pendulum.

12. In a device of the class described, a support, a normally vertical frame pivotally mounted for movement about a horizontal axis in said support, a gyro unit pivotally mounted in said frame for movement about a vertical axis and having its spinning axis at an angle to the vertical, means for causing said gyro unit to follow the movements of said frame in azimuth, means whereby said first means is rendered effective when said gyro unit and said frame are displaced from a predetermined position with respect to each other, a pendulum, means for applying a torque to said gyro unit about said vertical axis for causing precession of said frame about said horizontal axis for maintaining said frame in predetermined position with respect to said pendulum, and means whereby said last-named means is rendered effective when said frame is displaced with respect to said pendulum.

13. In a device of the class described, a support, a normally vertical frame pivotally mounted for movement about a horizontal axis in said support, a gyro unit pivotally mounted in said frame for movement about a vertical axis and having its spinning axis at an angle to the vertical, means for causing said gyro unit to follow the movements of said frame in azimuth, means whereby said first means is rendered effective when said gyro unit and said frame are displaced from a predetermined position with respect to each other, means for maintaining said frame vertical, and means whereby said vertical-maintaining means is rendered ineffective in response to acceleration.

LESLIE F. CARTER.